(12) United States Patent
Joseph et al.

(10) Patent No.: US 6,848,292 B2
(45) Date of Patent: Feb. 1, 2005

(54) SYSTEM FOR CALIBRATION OF PRESSURE TRANSDUCERS

(75) Inventors: Antony Joseph, Goa (IN); Vijay Kumar, Goa (IN); Shivanand Prabhudesai, Goa (IN); Prakash Mehra, Goa (IN); Ehrlich Desa, Goa (IN); Surekha mahesh Nagvekar, Goa (IN)

(73) Assignee: Council of Scientific and Industrial Research, New Delhi (IN)

( * ) Notice: Subject to any disclaimer, the term of this patent is extended or adjusted under 35 U.S.C. 154(b) by 51 days.

(21) Appl. No.: 10/104,220

(22) Filed: Mar. 22, 2002

(65) Prior Publication Data

US 2003/0177812 A1 Sep. 25, 2003

(51) Int. Cl.[7] ............................................. G01N 31/00
(52) U.S. Cl. .......................................... 73/1.57; 73/1.68
(58) Field of Search ................................. 73/1.57–1.69

(56) References Cited

U.S. PATENT DOCUMENTS

| | | | | |
|---|---|---|---|---|
| 596,581 A | * | 1/1898 | Edson | .......................... 73/1.68 |
| 821,988 A | * | 5/1906 | Craig | .......................... 73/1.65 |
| 4,658,829 A | * | 4/1987 | Wallace | ....................... 600/488 |
| 4,739,663 A | * | 4/1988 | Peterson | ........................ 73/703 |
| 4,862,909 A | * | 9/1989 | Kim, II | ....................... 137/150 |
| 5,222,534 A | * | 6/1993 | Wilkinson, Jr. | ............... 141/88 |
| 6,450,005 B1 | * | 9/2002 | Bentley | ....................... 73/1.59 |

* cited by examiner

*Primary Examiner*—Robert Raevis
(74) *Attorney, Agent, or Firm*—Harness Dickey & Pierce, P.L.C.

(57) ABSTRACT

The present invention relates to system for calibrating plurality of pressure transducers, said system comprising plurality of pressure transducers (13.1 to 13.n) mounted on a mounting means (12) which receives pressure input from a pressure source (11) via a hollow pipe (14) and distributes the pressure evenly to all the pressure transducers, said plurality of pressure transducers are mounted on the mounting means and placed inside a vessel (15) as to vary the temperature of the pressure transducers, said pressure source is also connected to a standard pressure transducer (17) whose temperature is maintained at the same level as that of pressure transducers (13.1 to 13.n).

24 Claims, 5 Drawing Sheets

SYSTEM FOR CALIBRATION OF PRESSURE TRANSDUCERS

FIELD OF THE INVENTION

The present invention relates to a system for calibrating plurality of pressure transducers, said system comprising plurality of pressure transducers (13.1 to 13.n). More particularly, the present invention relates to a system which facilitates the study of temperature-dependence sensitivity of a plurality of pressure transducers, said system improves the calibration accuracy by providing a means to circumvent the temperature sensitivity of a standard pressure transducer against which the pressure transducers are calibrated. The system also improves the calibration resolution by providing a means to calibrate the pressure transducer at close pressure intervals said system also minimizes the stabilization time for the pressure input at the transducers and thereby reducing the time duration required for calibration.

BACKGROUND OF THE INVENTION

Hitherto known systems for calibration of pressure transducers [P. N. Modi and S. M. Seth, "Fluid Pressure and Its Measurement", Hydraulics and Fluid Mechanics, 1392 pp. (1981)] describe a Dead-Weight Pressure Gauge wherein a cylindrical plunger slides within a vertical hollow cylinder, which is filled with oil. A pressure transducer, which is to be calibrated, is set in parallel with the dead-weight gauge. Viscous oil is slowly pumped into the cylinder (and the pressure inlet of the said pressure transducer to be calibrated). The oil, which enters the cylinder under pressure, exerts a force on the plunger, thereby lifting the plunger and balancing it against the oil pressure. This force is balanced by the weights loaded on the top of the plunger. When the oil pressure and the weights balance, the oil pressure is known from the weights and the diameter of the plunger. The pressure of the oil being thus known, the attached pressure transducer can be calibrated. The plunger can be loaded with various known weights, and the pressure transducer can be calibrated against the corresponding pressure values. The disadvantage of this arrangement is the error involved in the estimated oil-pressure due to frictional resistance offered to the motion of the plunger in the cylinder. This error can be minimized if the plunger is carefully ground, so as to fit with the least permissible clearance in the cylinder, but not completely removed. Moreover, the whole mass needs to be rotated by hand before the readings are taken. Another drawback is that the number of calibrated weights available with a dead-weight tester is limited, thereby impeding the calibration of the pressure transducer at close pressure intervals.

An alternate system, [T. G. Beckwith and N. L. Buck, "Measurement of Pressure", Mechanical Measurements, Addison-Wesley Publishing Company, 642 pp. (1969)], describes a dead-weight tester commonly used as a source of static pressure for calibration purposes, and is basically a pressure-producing and pressure-measuring device, wherein the resulting pressure is estimated from knowledge of the applied weights and the piston area. In this device, the pressure transducer to be calibrated is connected to a chamber filled with a fluid (oil) whose pressure can be adjusted by some type of pump and bleed valve. The chamber also connects with a vertical piston-cylinder to which various standard weights may be applied. The pressure is: slowly built up until the piston and weights are seen to "float", at which point the fluid "gage" pressure (i.e., pressure above atmosphere) must equal the deadweight supported by the piston, divided by the piston area. A drawback of this methodology is that a number of refinements and corrections are necessary to achieve highly accurate results. The frictional force between the cylinder and piston must be reduced to a minimum and/or corrected for. Another drawback is that corrections are needed for temperature effects on areas of piston and cylinder, air and pressure-medium buoyancy effects, local gravity conditions, and height differences between the lower end of the piston and the reference point for the pressure transducer being calibrated. Further, as the piston assembly itself has weight, conventional dead-weight gages are not capable of measuring pressures lower than the piston weight/area ratio.

Another system, [E. O. Doebelin, "Pressure and Sound Measurements", Measurement Systems: Application and Design ($3^{rd}$ Edition, International Student Edition), pp. 404–462 (1983)], describes a U-tube manometer whose operation is based on the comparison of the unknown pressure (P) with the gravity (g), based on the well-known expression; $P = h\rho g$, where h is the height of the liquid column in the tube, and p is the density of the liquid. The cross-sectional area of the tubing (even if not uniform) has no effect. At a given location (given value of g) the sensitivity depends on only the density of the manometer fluid. An advantage of this device is that it is self-balancing and has a continuous rather than stepwise output. However, a disadvantage of this device is that it becomes unwieldy at high pressures because of the long liquid columns involved. Further, to realize the high accuracy possible with manometers, often a number of corrections need to be applied. When visual reading of the height h is employed, the engraved-scale's temperature expansion must be considered. The variation of the value of ρ of the manometer fluid with temperature must be corrected and the local value of g determined. Additional sources of error are found in the non-verticality of the tubes and the difficulty in reading h because of the meniscus formed by capillarity.

Yet another system [S. Vamagy, "Pressure Calibration Systems and Control Valve Assemblies", U.S. Pat. No. 4,698,998 {assigned to Consolidated Controls Corporation} describes a pressure calibration system for calibrating high-pressure transducers and gaging systems. The said pressure calibration system incorporates a pressure cylinder, which is filled with compressed nitrogen gas through a fill port. The pressure cylinder is filled, from an external tank of compressed nitrogen, by pneumatically connecting them through a "pressure cable" hose and a plurality of pressure regulator valves, pressure isolation valves, vent valves, vent isolation valves, side ports, end ports, vernier balancing conduits, and knobs. A "supply pressure" gage mounted on the front-panel of the pressure calibration system indicates the pressure in the internal storage tank. A test port provided on the front panel of the calibration system provides a means for connection of the pressure equipment that is to be calibrated. The calibration of the pressure transducer/gauge is performed against a self-calibrating pressure transducer. An advantage of the system of this invention is that it is self-contained and portable, and incorporate control valves and isolation valves, thereby providing positive shutoff, combined with extremely low torque operation, permitting fine manual adjustment of calibration pressure. Another advantage of this system is that it is capable of providing pressure calibration over a working range extending from a vacuum to 10,000 psi. A disadvantage of this system, however, is that its calibration accuracy is limited by the temnperature-sensitivity of the pressure-standard against which the pressure calibration is performed. Another limitation of this system is that it does not provide a means to study the temperature-dependence of the pressure transducers being calibrated. Yet another disadvantage of this system is that the number of pressure transducers that can be calibrated simultaneously is limited to two.

OBJECTS OF THE INVENTION

The main object of the present invention is to provide a system for calibrating a plurality of pressure transducers simultaneously.

Another object of the present invention is to provide a mounting means having the facility for uniform pressure distribution so that all the pressure transducers to be calibrated are simultaneously subjected to the same pressure.

Still another object of the present invention is to provide a system that facilitates study of temperature-dependence sensitivity of pressure transducers by locating the said pressure transducers together with their common mounting means in a medium whose temperature can be maintained constant at a given desired value during a given set of input pressure values, and altered to a different constant temperature value during a subsequent set of input pressure values as required during calibration.

Yet another object of the present invention is to provide a system wherein a means is provided to circumvent the temperature-sensitivity of the pressure-standard against which the pressure transducers are calibrated, thereby improving the calibration accuracy of the system.

A further object of the present invention is to provide a system wherein a means is provided to calibrate the pressure transducers at close pressure intervals, thereby improving the calibration resolution.

One more object of the present invention is to provide a system wherein a means is provided to minimize the time taken for the input pressure to get stabilized, thereby increasing time duration taken for calibrating.

DETAILED DESCRIPTION OF THE PRESENT INVENTION

Accordingly, the present invention provides a system for calibrating plurality of pressure transducers, said system comprising plurality of pressure transducers (13.1 to 13.n) mounted on a mounting means (12) which receives pressure input from a pressure source (11) via a hollow pipe (14) and distributes the pressure evenly to all the pressure transducers, said plurality of pressure transducers are mounted on the mounting means and placed inside a vessel (15) so as to vary the temperature of the pressure transducers, said pressure source is also connected to a standard pressure transducer (17) whose temperature is maintained at the same level as that of pressure transducers (13.1 to 13.n).

In an embodiment of the present invention, the means for mounting (12) the pressure transducers (13.1 to 13.n) comprises of a cylindrical body having an input channel (30) connected to the hollow cylinder (14) via a link 31 and an adapter (32) to receive the pressure, said cylindrical body is cast with a plurality of channels (26.1 to 26.n) along its radius and terminating at its periphery for distributing the pressure equally to all the pressure transducers, said channels are provided with slots (29.1 to 29.n) at equidistant points from the center of the cylinder to accommodate the inlets of the pressure transducers and said channels are closed at the periphery using plugs (27.1 to 27.n) and leak-protected washers (28.1 to 28.n).

In another embodiment of the present invention, the inputs of the pressure transducers (13.1 to n) are located such that pressure being applied by the pressure source (11) gets equally transmitted to all transducer inlets in the minimum possible time via the channels (26.1 to 26.n).

In yet another embodiment of the present invention, the inlets of the pressure transducers to be calibrated (13.1 to 13.n) intersect at the bottom of the slots (29.1 to 29.n).

In still another embodiment of the present invention, the pressure being applied to the pressure transducers is directed first towards the center of the cylinder via channel (30) and then directed via the channels (26.1 to 26.n) to the inputs of the pressure transducers (13.1 to 13.n) to enable all transducers to be stabilized simultaneously, after a change in the input pressure.

In a further embodiment of the present invention, the pressure source (11) comprises a chamber holding a pressure transmission medium, said chamber is loaded with standard weights from top to build pressure in the pressure transmission medium, an adjustable piston attached with a bleed handle at its one end through a handle is attached to said chamber at the other end for fine adjustment of the pressure in the pressure transmission medium.

In one more embodiment of the present invention, the pressure transmission medium is a liquid.

In one another embodiment of the present invention, said liquid is oil or water.

In an embodiment of the present invention, the plurality of transducers (13.1 to 13.n) are connected to a display or recording medium (20) for displaying or recording the pressure output from the pressure transducers.

In another embodiment of the present invention, the display or recording medium (20) is a computer or any other conventional display mechanism.

In yet another embodiment of the present invention, the vessel (15) is provided with means for supplying hot/cold water to vary the temperature of the pressure transducers.

In still another embodiment of the present invention, the vessel (15) is optionally provided with a temperature measuring means (16) to measure and a display means (22) for displaying the temperature of the water accurately.

In a further embodiment of the present invention, the temperature measuring means (16) is thermometer.

In one more embodiment of the present invention, the display means (22) may be a digital or an analog display unit In one another embodiment of the present invention, the standard pressure transducer is already calibrated.

In an embodiment of the present invention, the standard pressure transducer is a piezo electric sly transducer or any other conventional transducer having high accuracy.

In another embodiment of the present invention, the standard pressure transducer is kept inside a vessel (18) and is connected to the pressure source through a hollow pipe (21).

In yet another embodiment of the present invention, the vessel (18) is provided with means for supplying hot/cold water to vary the temperature of the standard pressure transducer.

In still another embodiment of the present invention, the vessel (18) is optionally provided with a temperature measuring means (23) to measure and a display means (24) for displaying the temperature of the water accurately.

In a further embodiment of the present invention, the temperature measuring means (23) is thermometer.

In one more embodiment of the present invention, the display means (24) may be a digital or an analog display unit.

In one another embodiment of the present invention, the standard pressure transducer(17) is connected to a display or recording medium (19) for displaying or recording the pressure output.

In an embodiment of the present invention, the length of the pipes (14) and (21) are such that the pressure being applied to the pressure transducers (13.1 to 13.n) that are to be calibrated is also applied to the standard pressure transducer (17).

In another embodiment of the present invention, the total distance of the pressure channels from the dead weight tester to the standard pressure transducer and the transducers to be calibrated are same.

In yet another embodiment of the present invention, the length of the pipe (14) and (21) are such that minimum stabilization time is achieved after a step change in the input pressure.

The improved system for calibration of pressure transducers of the present invention provides for:

1. A means for simultaneous calibration of a multiplicity of pressure transducers by locating them on a mounting means having the facility for uniform pressure distribution so that all the pressure transducers to be calibrated are simultaneously subjected to the same pressure. The system of the present invention provides for a circular mounting means wherein a number of equally spaced slots provided on its flat surface are used for locating the pressure inlet of the pressure transducers to be calibrated. These slots are hydraulically connected to the central axis of the said circular mounting means via internal channels drilled radially from the side wall of the said system into its central axis, which in turn is hydraulically connected to a pressure source via a separate internal channel.

2. Study of temperature-sensitivity of a multiplicity of pressure transducers by locating the said pressure transducers together with their common mounting means in a medium whose temperature can be maintained constant at a given desired value during a given set of input pressure values. The pressure transducers together with their common mounting means are located in a vessel of suitable size wherein a sufficient quantity of water is preserved to immerse the pressure transducers to the desired level thereby maintaining the transducers at a desired constant temperature. The temperature of the water medium that surrounds all the pressure-transducers is monitored with a calibrated digital thermometer for temperature reading without parallax errors, and the desired constant temperature is maintained throughout a given calibration by addition of appropriate quantity of cooled/heated water followed by vigorous stirring. Different sets of calibration can be performed at various desired constant temperatures.

3. Improving the calibration accuracy by providing a means to circumvent the temperature sensitivity of the pressure-standard against which the pressure transducers are calibrated. Amongst the currently available pressure standards, those that provide the finest pressure resolution are the quartz pressure transducers that are operated at the optimum constant ambient temperature as reported by J. M. Paros [in "Digital Pressure Transducer", U.S. Pat. No. 4,455,874(1984)], and further reported by R. B. Wearn, Jr., and J. M. Paros [in "Measurements of dead weight tester performance using high resolution quartz crystal pressure transducers", Instrument Society of America, 8 pp, [(1988)]. The calibration accuracy of the system of the present invention is improved by locating the quartz pressure transducer (pressure-standard) in a fluid medium (water) whose temperature can be maintained constant at the optimum temperature at which it provides the best results.

Improving the calibration resolution by providing a means to calibrate the pressure transducer/transducers at close pressure intervals. In the system of the present invention, the pressure-standard is a quartz pressure transducer whose output is in digital format and provides fine pressure resolution as reported by J. M. Paros [in "Digital Pressure Transducers", Measurements & Data, Vol. 10, No.2, 6 p (1976)]; D. W. Busse [in "Digital Quartz Pressure Transducers for Air Data Applications", pp. V-7-1 to V-7-15 (1978)]; R. B. Wearn and N. G. Larson [in "Measurements of the Sensitivity and Drift of Digiquartz Pressure Transducers", Deep-Sea Res., Vol. 29 A, pp. 111–134 (1982); D. W. Busse [in "Quartz Transducers for Precision Under Pressure", Mech. Eng., Vol. 109, No. 5, 5 p. (1987)]; and T. Schaad [in "Eleven-Year Test of Barometer Long-Term Stability", www.paroscientific.com/11veartest.htm (2000)] and a capability for digital display of its output.

BRIEF DESCRIPTION OF THE ACCOMPANYING DRAWINGS

In the drawings accompanying this specification:

Figure 4:
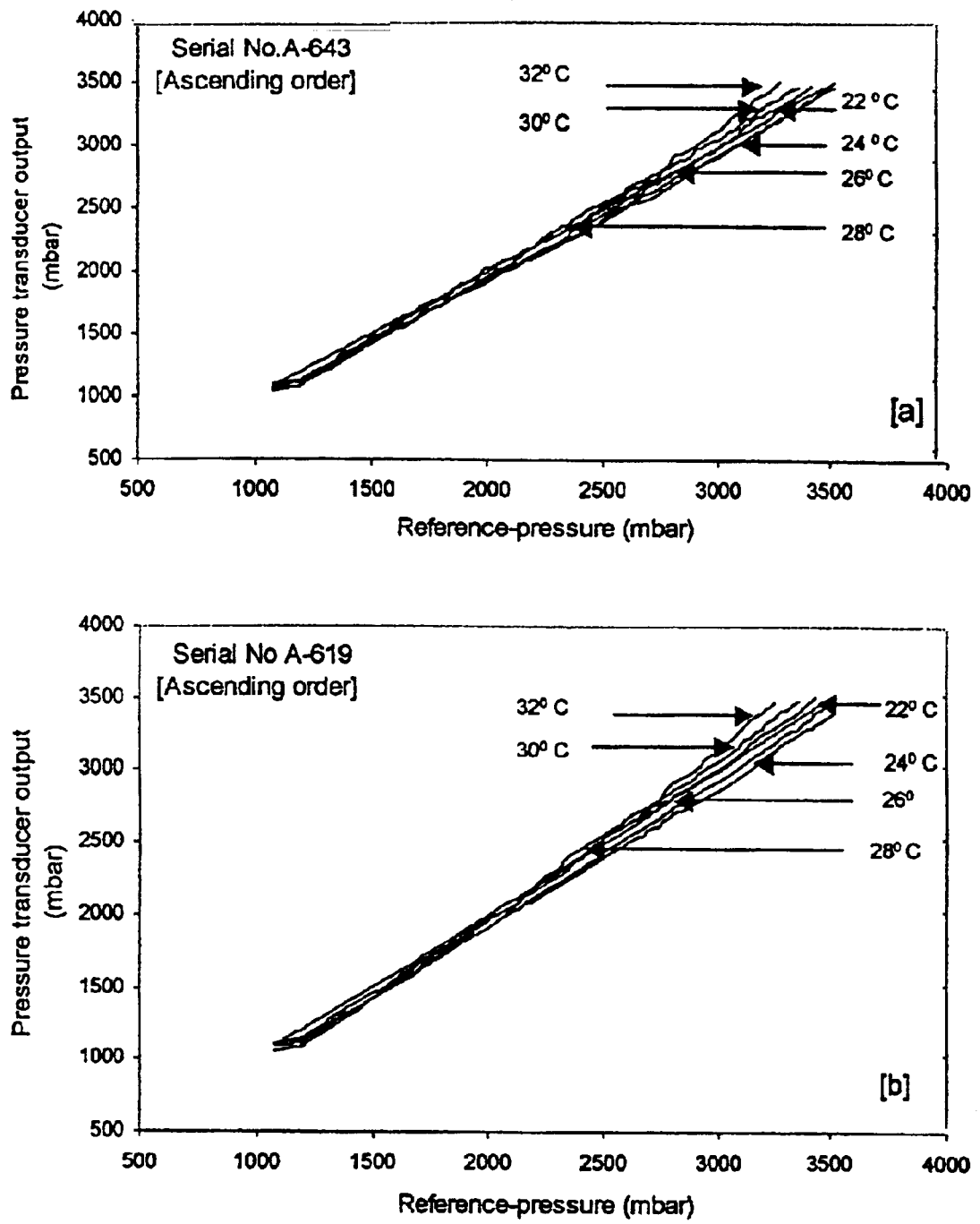

FIG. 4 indicates the temperature-sensitivity of two pressure transducers as obtained from their simultaneous calibration at 6 different ambient temperatures using the calibration system of the present invention at ascending input pressure steps.

Figure 5:
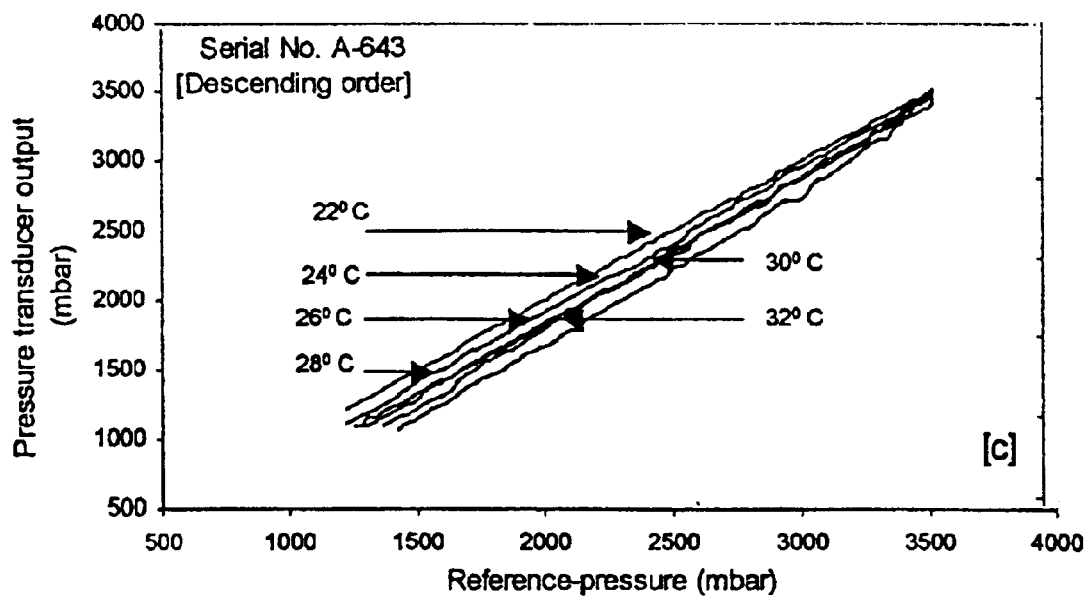
Figure 5:
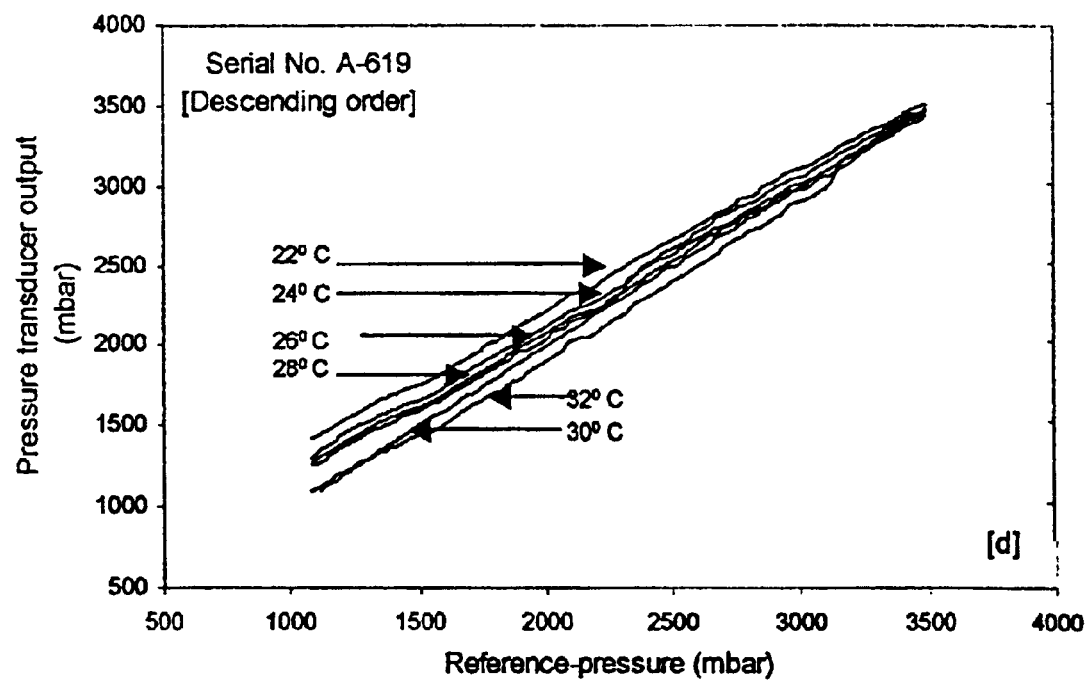

FIG. 5 demonstrates the temperature-sensitivity of two pressure transducers as obtained from their simultaneous calibration at 6 different ambient temperatures using the calibration system of the present invention at descending input pressure steps.

The present invention will now be described in detail with reference to the accompanying drawings which are given solely for the purpose of understanding the invention and hence, should not be construed to limit the scope of the invention in any manner.

Figure 1:
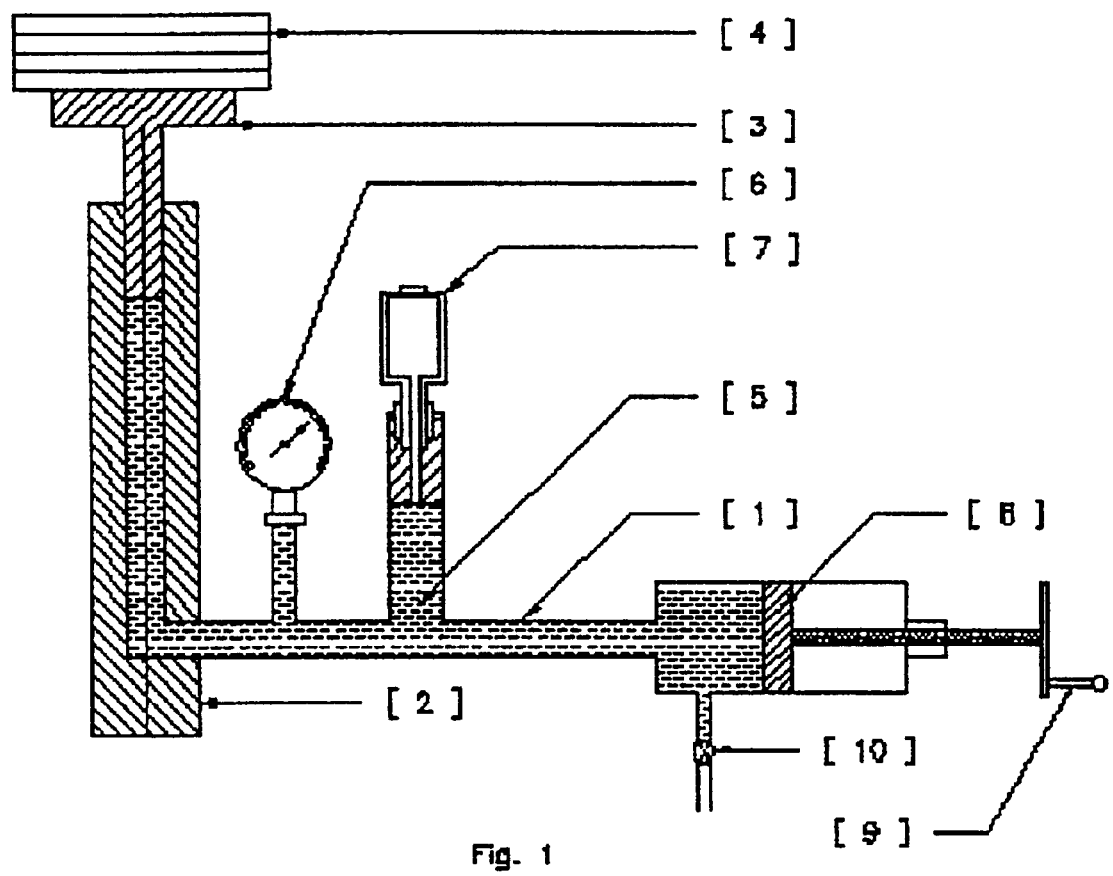
FIG. 1 represents a conventional system for calibration pressure transducers.

FIG. 1 represents a typical design example, showing a conventional dead-weight tester system of the prior art used for calibration of a pressure transducer, which consists primarily of a chamber (1), a vertical cylinder (2), a piston (3) to which various standard weights (4) are applied to build up pressure in the oil (5) that is the common pressure transmission medium, a dial gage (6) that indicates the pressure of the oil, a pressure transducer (7) to be calibrated, an adjustable piston (8) with a handle (9), and a bleed valve (10) for fine adjustment of the oil-pressure.

Figure 2:
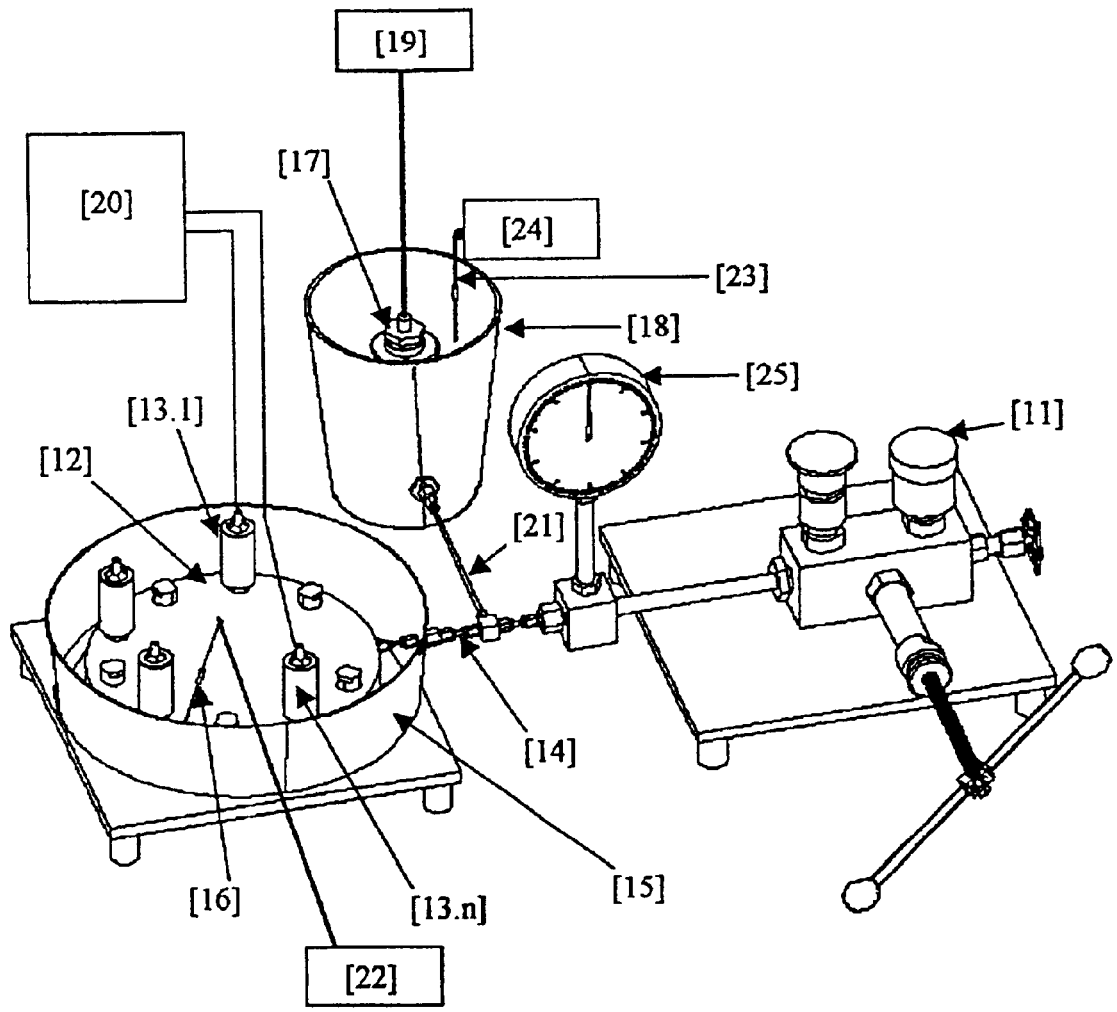
FIG. 2 shows the isometric view of the improved system for calibration of pressure transducers of the present invention.

FIG. 2 is an isometric view of the improved system for calibration of pressure transducers of the present invention, which consists primarily of a dead-weight tester (11) with its dial-gauge (25), which is similar to that shown in FIG. 1, a pressure-transducer-mounting means (12) that can accommodate a multiplicity of pressure transducers (13.1), . . . (13.n), hollow pipe for pressure transmission to the mounting means (12), vessel (15) that holds temperature-controlled water around the multiplicity of pressure transducers to be calibrated, a thermometer (16) for sensing the temperature of the water in the said vessel (15), temperature display unit (22) for digital display of temperature of the water in the vessel (15), precision pressure transducer (17) that is used as a pressure-standard, vessel (18) that holds temperature-controlled water around the pressure-standard (17), a display/recording medium (19) that displays/records the pressure output of the pressure-standard, a thermometer (23) for sensing the temperature of the water in the vessel (18), temperature display unit (24) for digital display of temperature of the water in the vessel (18), and a computer means (20) that displays/records the outputs of the multiplicity of pressure transducers that are to be calibrated simultaneously. In the system of the present invention, the dead-weight tester (11) is used merely as a tool for varying the fluid pressure, and not as a pressure-calibrator. The lengths of the pipes (14) and (21), which form the pressure channels to the pressure-transducer-mounting means (12) and precision pressure transducer (17) that is used as a pressure-standard (i.e., the pressure-calibrator) respectively, are such that the total distance of the pressure channels from the dead-weight tester to the pressure-calibrator and the transducers to be calibrated are close to each other, thereby achieving minimal stabilization time after a step change in the input pressure.

Figure 3:
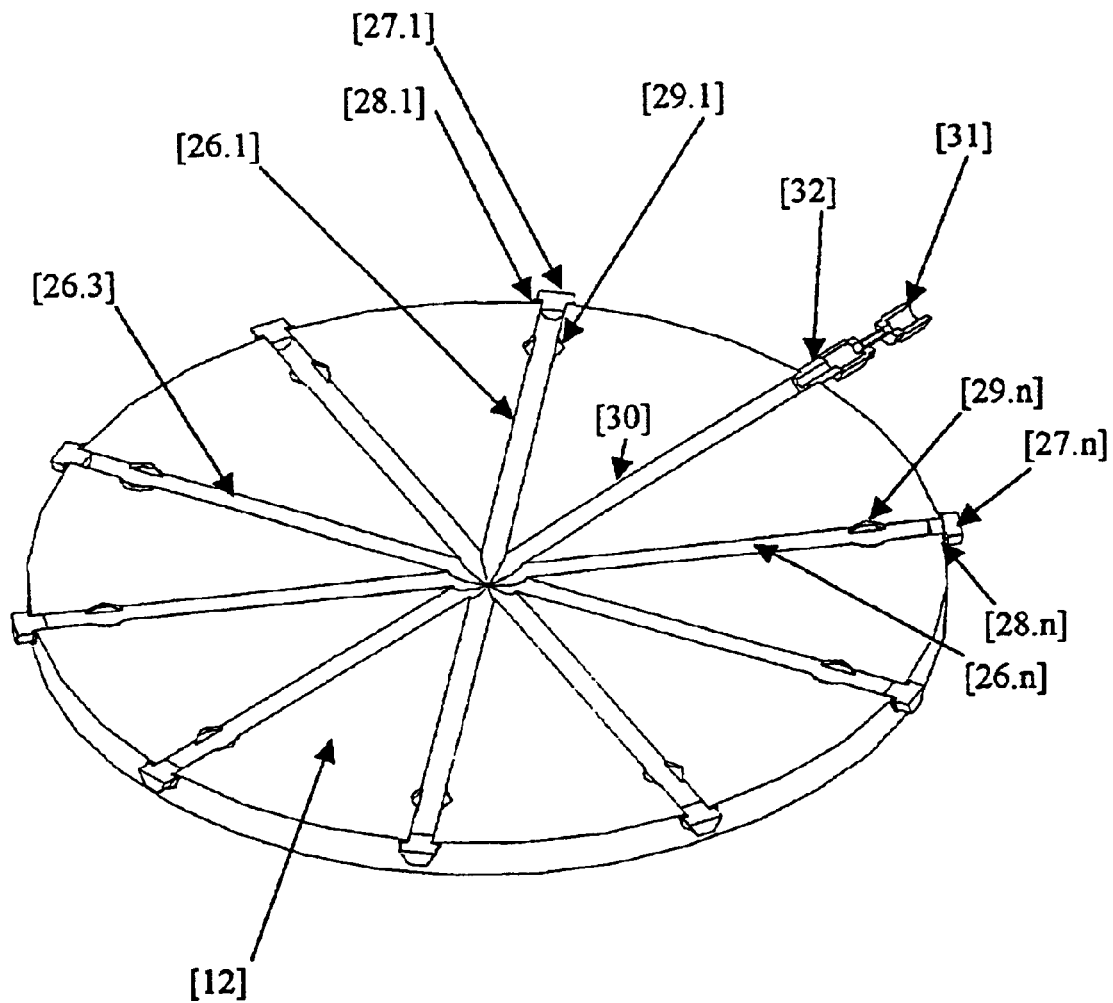
FIG. 3 illustrates the mid-planar cross-sectional view of the pressure-transducer-mounting means of the present invention.

FIG. 3 is a mid-planar cross-sectional view of the pressure-transducer-mounting means (12) of the present invention, shown in an isometric style, wherein a multiplicity of pressure transducers (13.1), . . . (13.n) can be located such that pressure is equally transmitted to all the said transducers in the minimum possible time, via channels (26.1, . . . 26.n), thereby achieving minimal stabilization time after a step change in the input pressure. These channels are closed at the periphery of the pressure-transducer-mounting means (12) using plugs (27.1), . . . (27.n), which are leak-protected using copper washers (28.1), . . . (28.n). The pressure inlet of the pressure transducers (13.1), . . . (13.n) to be calibrated intersect at the bottom of the slots (29.1), . . . (29.n) that is located on the pressure-transducer-mounting means (12). The link (31) and adapter (32) together facilitate an excellent pressure-tight joint between the pipe (14) and the pressure-transducer-mounting means (12). In the pressure-transducer-mounting means (12), the pressure is diverted first into its central portion via channel (30) and then diverted into the pressure port of the transducers that are equidistant from the central portion of the mounting means, thereby enabling all the transducers to be stabilized simultaneously.

FIG. 4 shows a typical example illustrating the usefulness of the improved system for calibration of pressure transducers of the present invention, wherein the temperature-sensitivity of two pressure transducers have been obtained from their simultaneous calibration at 6 different ambient temperatures at ascending input pressure steps. These transducers are of the strain-gauge type as described by A. Joseph [in "Modern techniques of sea level measurement", Encyclopedia of Microcomputers, Marcel Dekker, Inc., New York, Vol. 23, pp. 319–344 (1999)], and temperature-compensated partially, although use of any other type of pressure transducers does not limit the scope of the present invention.

FIG. 5 shows the temperature-dependence of two strain-gauge pressure transducers as obtained from their simultaneous calibration at 6 different ambient temperatures using the calibration system of the present invention at descending input pressure steps.

The present invention provides an improved system for calibration of pressure transducers, which comprises of a dead-weight tester (11) with its dial-gauge (25), a pressure-transducer-mounting means (12) that can accommodate a multiplicity of pressure transducers (13.1), . . . (13.n), hollow pipe (14) for pressure transmission to the mounting means (12), vessel (15) that holds temperature-controlled water around the multiplicity of pressure transducers to be calibrated, a thermometer (16) for sensing the temperature of the water in the said vessel (15), temperature display unit (22) for digital display of temperature of the water in the vessel (15), precision pressure transducer (17) that is used as a pressure-standard, vessel (18) that holds temperature-controlled water around the pressure-standard (17), a display/recording medium (19) that displays/records the pressure output of the pressure-standard, a thermometer (23) for sensing the temperature of the water in the vessel (18), temperature display unit (24) for digital display of temperature of the water in the vessel (18), and a computer (20) that displays/records the outputs of the multiplicity of pressure transducers that are to be calibrated simultaneously.

The dead-weight tester [11] is used merely as a tool for varying the fluid pressure, and not as a pressure-calibrator.

The lengths of the pipes (14) and (21), which form the pressure channels to the pressure-transducer-mounting means (12) and precision pressure transducer (17) that is used as a pressure-standard (i.e., the pressure-calibrator) respectively, are such that the total distance of the pressure channels from the dead-weight tester to the pressure-calibrator and the transducers to be calibrated are close to each other, thereby achieving minimal stabilization time after a step change in the input pressure.

A multiplicity of pressure transducers (13.1), . . . (13.n) can be located such that pressure is equally transmitted to all the said transducers in the minimum possible time, via channels (26.1, . . . 26.n), thereby achieving minimal stabilization time after a step change in the input pressure. These channels are closed at the periphery of the pressure-transducer-mounting means (12) using plugs (27.1), . . . (27.n), which are leak-protected using copper washers (28.1), . . . (28.n). The pressure inlet of the pressure transducers (13.1), . . . (13.n) to be calibrated intersect at the bottom of the slots (29.1), . . . (29.n) that is located on the pressure-transducer-mounting means (12). The link (31) and adapter (32) together facilitate an excellent pressure-tight joint between the pipe (14) and the pressure-transducer-mounting means (12).

In the pressure-transducer-mounting means (12), the pressure is diverted first into its central portion via channel (30) and then diverted into the pressure port of the transducers that are equidistant from the central portion of the mounting means, thereby enabling all the transducers to be stabilized simultaneously.

The device of the present invention has been successfully implemented to calibrate strain-gauge pressure transducers that are used in sea level gauges, although use of any other type of pressure transducers does not limit the scope of the present invention. In this, each set of calibration was performed at various preplanned temperatures to study the temperature-sensitivity of these transducers. It was observed that the device of the present invention worked efficiently and without any problems.

THE MAIN ADVANTAGES OF THE PRESENT INVENTION

1. It provides a means for simultaneous calibration of a multiplicity of pressure transducers by locating them on a mounting means having the facility for uniform pressure distribution 2. It facilitates the study of temperature-sensitivity of pressure transducers by locating the said pressure transducers together with their common mounting means in a medium whose temperature can be maintained constant at a given desired value during a given set of input pressure values, and altered to a different constant temperature value during a subsequent set of input pressure values as required during calibration.

3. It improves the calibration accuracy by providing a means to circumvent the temperature sensitivity of the pressure-standard against which the pressure transducers are calibrated, by locating the said pressure-standard in a medium whose temperature can be maintained constant at the optimum temperature at which it provides the best results.

4. It improves the calibration resolution by providing a means to calibrate the pressure transducers at close pressure intervals, by the use of an accurate pressure-standard having fine pressure resolution and a capability for digital display of its output.

What is claimed is:

1. A system for calibrating a plurality of pressure transducers, said system comprising a plurality of pressure transducers (13.1 to 13.n) mounted on a mounting means (12) including a cylindrical body having an input channel (30) connected to a hollow pipe (14) via link (31) and an adapter (32) to receive the pressure, said cylindrical body is cast with a plurality of channels (26.1 to 26.n) alone its radius and terminating at its periphery for distributing the pressure equally to all the pressure transducers, said channels are provided with slots (29.1 to 29.n) at equidistant points from the center of the cylinder to accommodate the inlets of the pressure transducers and said channels are closed at the periphery using plugs (27.1 to 27.n) and leak-protected washers (28.1 to 28.n), said pressure transducers (13.1 to 13.n) receiving pressure input from a pressure source (11) via a hollow pipe (14) and distributes the pressure evenly to all the pressure transducers, said plurality of pressure transducers are mounted on the mounting means and placed inside a vessel (15) so as to vary the temperature of the, pressure transducers, said pressure source is also connected to a standard pressure transducer (17) whose temperature is maintained at the same level as that of pressure transducers(13.1 to 13.n).

2. A system as claimed in claim 1, wherein the inputs of the pressure transducers (13.1 to n) are located such that pressure being applied by the pressure source (11) gets equally transmitted to all transducer inlets in the minimum possible time via the channels (26.1 to 26.n).

3. A system as claimed in claim 1, wherein the inlets of the pressure transducers to be calibrated (13.1 to 13.n) intersect at the bottom of the slots (29.1 to 29.n).

4. A system as claimed in claim 1, wherein the pressure, being applied to the pressure transducers is directed first towards the center of the cylinder via channel (30) and then directed via the channels (26.1 to 26.n) to the inputs of the pressure transducers (13.1 to 13.n) to enable all transducers to be stabilized simultaneously, after a change in the input pressure.

5. A system as claimed in claim 1, wherein the pressure source (11) comprises a chamber holding a pressure transmission medium, said chamber is loaded with standard weights from top to build pressure in the pressure transmission medium, an adjustable piston attached with a bleed handle at its one end through a handle is attached to said chamber at the other end for fine adjustment of the pressure in the pressure transmission medium.

6. A system as claimed in claim 5, wherein the pressure transmission medium is a liquid.

7. A system as claimed in claim 6, wherein said liquid is oil or water.

8. A system as claimed in claim 1, wherein the plurality of transducers (13.1 to 13.n) are connected to a display or recording medium (20) for displaying or recording the pressure output from the pressure transducers.

9. A system as claimed in claim 8, wherein the display or recording medium (20) is a computer or any other conventional display mechanism.

10. A system as claimed in claim 1, wherein the vessel (15) is provided with means for supplying hot/cold water to vary the temperature of the pressure transducers.

11. A system as claimed in claim 10, wherein the vessel (15) is optionally provided with a temperature measuring means (16) to measure and a display means (22) for displaying the temperature of the water accurately.

12. A system as claimed in claim 11 wherein the temperature measuring means (16) is thermometer.

13. A system as claimed in claim 11, wherein the display means (22) may be a digital or an analog display unit.

14. A system as claimed in claim 1, wherein the standard pressure transducer is already calibrated.

15. A system as claimed in claim 1, wherein the standard pressure transducer is a piezoelectric transducer or any other conventional transducer having high accuracy.

16. A system as claimed in claim 1, wherein the standard pressure transducer is kept inside a vessel (18) and is connected to the pressure source through a hollow pipe (21).

17. A system as claimed in claim 16, wherein the vessel (18) is provided with means for supplying hot/cold water to vary the temperature of the standard pressure transducer.

18. A system as claimed in claim 17 the length of the pipe (14) and (21) are such that the pressure being applied to the pressure transducers (13.1 to 13.n) that are to be calibrated is also applied to the standard pressure transducer (17).

19. A system as claimed in claim 18, wherein the total distance of the pressure channels from the dead weight tester to the standard pressure transducer and the transducers to the calibrated are same.

20. A system as claimed in claim 17 wherein the length of the pipes (14) and (21) are such that minimum stabilization time is achieved after a step change in the input pressure.

21. A system as claimed in claim 17, wherein the vessel (18) is optionally provided with a temperature measuring means (23) to measure and a display means (24) for displaying the temperature of the water accurately.

22. A system as claimed in claim 21, wherein the temperature measuring means (23) is thermometer.

23. A system as claimed in claim 21, wherein the display means (24) may be a digital or an analog display unit.

24. A system as claimed in claim 1, wherein the standard pressure transducer (17) is connected to a display or recording medium (19) for displaying or recording the pressure output.

* * * * *